(12) United States Patent
Hodges (10) Patent No.: US 8,504,077 B2
(45) Date of Patent: Aug. 6, 2013

(54) SYSTEM AND METHOD FOR MONITORING AND DISSEMINATING MOBILE DEVICE LOCATION INFORMATION (75) Inventor: Daniel Hodges, San Francisco, CA (US)

(73) Assignee: WaveMarket, Inc., Emeryville, CA (US)

(*) Notice: Subject to any disclaimer, the term of this patent is extended or adjusted under 35 U.S.C. 154(b) by 102 days.

(21) Appl. No.: 12/960,485

(22) Filed: Dec. 4, 2010

(65) Prior Publication Data
US 2012/0142369 A1 Jun. 7, 2012

(51) Int. Cl.
H04Q 7/20 (2006.01)

(52) U.S. Cl.
USPC .......... 455/456.5; 455/456.6; 455/456.1; 342/357.28

(58) Field of Classification Search
USPC .............. 455/456.5, 456.1; 342/357.28
See application file for complete search history.

(56) References Cited

U.S. PATENT DOCUMENTS

| | | |
|---|---|---|
| 5,045,861 A | 9/1991 | Duffett-Smith et al. |
| 5,524,136 A | 6/1996 | Barnoy et al. |
| 5,564,079 A | 10/1996 | Olsson |
| 5,666,651 A | 9/1997 | Wang |
| 5,774,824 A | 6/1998 | Streit et al. |
| 5,905,953 A | 5/1999 | Liu et al. |
| 5,950,125 A | 9/1999 | Buhrmann et al. |
| 5,969,679 A | 10/1999 | Bolliger |
| 5,999,126 A | 12/1999 | Ito |
| 6,041,236 A | 3/2000 | Bernardin et al. |
| 6,052,064 A | 4/2000 | Budnik et al. |
| 6,061,021 A | 5/2000 | Zibell |
| 6,073,089 A | 6/2000 | Baker et al. |
| 6,088,598 A | 7/2000 | Marsolais |
| 6,097,939 A | 8/2000 | Jacobs |
| 6,104,344 A | 8/2000 | Wax et al. |
| 6,167,265 A | 12/2000 | Kim et al. |
| 6,185,422 B1 | 2/2001 | Mattila |
| 6,201,499 B1 | 3/2001 | Hawkes et al. |
| 6,205,326 B1 | 3/2001 | Tell et al. |
| 6,263,208 B1 | 7/2001 | Chang et al. |
| 6,266,534 B1 | 7/2001 | Raith et al. |
| 6,269,246 B1 | 7/2001 | Rao et al. |
| 6,330,600 B1 | 12/2001 | Matchefts et al. |

(Continued)

FOREIGN PATENT DOCUMENTS

| | | |
|---|---|---|
| AU | 200066612 B2 | 10/2000 |
| DE | 29919376 U1 | 2/2000 |

(Continued)

OTHER PUBLICATIONS

Mir et. al, "A Zone-Based Location Service for Mobile Ad Hoc Networks", 1NCC 2004, Jun. 2004.

(Continued)

Primary Examiner — Danh Le
(74) Attorney, Agent, or Firm — Dovas Law, P.C.

(57) ABSTRACT

A computer-implemented mobile device locating method is provided. The method includes monitoring a location indication of a mobile device and an indication of precision or accuracy of the location indication. A change in the precision or accuracy of the location indication is identified, and a position of the mobile device is estimated based on the location indication as monitored prior to the identified change. A mobile device configured for implementing a mobile device locating method is further provided.

23 Claims, 4 Drawing Sheets

U.S. PATENT DOCUMENTS

| | | |
|---|---|---|
| 6,356,763 B1 | 3/2002 | Kangas et al. |
| 6,360,094 B1 | 3/2002 | Satarasinghe |
| 6,393,294 B1 | 5/2002 | Perez-Breva et al. |
| 6,411,819 B1 | 6/2002 | Gutowski |
| 6,449,257 B1 | 9/2002 | Choi |
| 6,449,486 B1 | 9/2002 | Rao |
| 6,496,701 B1 | 12/2002 | Chen et al. |
| 6,529,165 B1 | 3/2003 | Brice et al. |
| 6,556,842 B1 | 4/2003 | Ericsson |
| 6,560,442 B1 | 5/2003 | Yost et al. |
| 6,567,381 B1 | 5/2003 | Jeon et al. |
| 6,591,116 B1 | 7/2003 | Laurila et al. |
| 6,631,262 B1 | 10/2003 | Wee |
| 6,711,404 B1 | 3/2004 | Arpee et al. |
| 6,728,539 B2 | 4/2004 | Kuwahara |
| 6,748,224 B1 | 6/2004 | Chen et al. |
| 6,782,265 B2 | 8/2004 | Perez-Breva et al. |
| 6,799,046 B1 | 9/2004 | Tang |
| 6,801,850 B1 | 10/2004 | Wolfson |
| 6,834,180 B1 | 12/2004 | Marshall |
| 6,856,805 B1 | 2/2005 | Raaf |
| 6,859,654 B1 | 2/2005 | Reynolds et al. |
| 6,947,734 B1 | 9/2005 | Toubassi |
| 6,947,835 B2 | 9/2005 | Kaplan et al. |
| 6,950,664 B2 | 9/2005 | Chen et al. |
| 6,961,587 B1 | 11/2005 | Vilppula et al. |
| 6,975,941 B1 | 12/2005 | Lau et al. |
| 7,031,722 B2 | 4/2006 | Naghian |
| 7,079,850 B2 | 7/2006 | Cameron |
| 7,096,115 B1 | 8/2006 | Groth et al. |
| 7,158,790 B1 | 1/2007 | Elliott |
| 7,158,798 B2 | 1/2007 | Lee et al. |
| 7,233,800 B2 | 6/2007 | Laroia et al. |
| 7,289,763 B2 | 10/2007 | Dennison et al. |
| 7,505,433 B2 | 3/2009 | Yaqub et al. |
| 7,668,832 B2 | 2/2010 | Yeh et al. |
| 7,697,920 B1 | 4/2010 | McClain |
| 7,751,827 B2 | 7/2010 | Poykko et al. |
| 8,229,669 B2 | 7/2012 | Roumeliotis et al. |
| 2001/0022558 A1 | 9/2001 | Karr et al. |
| 2002/0042268 A1 | 4/2002 | Cotanis |
| 2002/0042269 A1 | 4/2002 | Cotanis |
| 2002/0101834 A1 | 8/2002 | Stanley |
| 2002/0111772 A1 | 8/2002 | Skidmore et al. |
| 2002/0128019 A1 | 9/2002 | Ben-Yair et al. |
| 2002/0164997 A1 | 11/2002 | Parry |
| 2002/0168989 A1 | 11/2002 | Dooley et al. |
| 2002/0173275 A1 | 11/2002 | Coutant |
| 2002/0193150 A1 | 12/2002 | Pritchard |
| 2003/0008668 A1 | 1/2003 | Perez-Breva et al. |
| 2003/0032404 A1 | 2/2003 | Wager et al. |
| 2003/0040318 A1 | 2/2003 | Fattouche |
| 2003/0043941 A1 | 3/2003 | Johnson et al. |
| 2003/0060214 A1 | 3/2003 | Hendrey et al. |
| 2003/0078042 A1 | 4/2003 | Miriyala et al. |
| 2003/0078055 A1 | 4/2003 | Smith et al. |
| 2003/0109274 A1 | 6/2003 | Budka et al. |
| 2003/0119501 A1 | 6/2003 | Kim |
| 2003/0125031 A1 | 7/2003 | Sung Lim et al. |
| 2003/0147362 A1 | 8/2003 | Dick et al. |
| 2003/0148771 A1 | 8/2003 | de Verteuil |
| 2003/0186710 A1 | 10/2003 | Muhonen et al. |
| 2003/0190916 A1 | 10/2003 | Celedon et al. |
| 2003/0208589 A1 | 11/2003 | Yamamoto |
| 2004/0018835 A1 | 1/2004 | Myers et al. |
| 2004/0037258 A1 | 2/2004 | Scherzer et al. |
| 2004/0116111 A1 | 6/2004 | Saunders |
| 2004/0132464 A1 | 7/2004 | Poykko et al. |
| 2004/0152470 A1 | 8/2004 | Spain |
| 2004/0157621 A1 | 8/2004 | Yamasaki et al. |
| 2004/0160365 A1 | 8/2004 | Riley et al. |
| 2004/0185822 A1 | 9/2004 | Tealdi et al. |
| 2004/0199398 A1 | 10/2004 | Kubota |
| 2004/0203717 A1 | 10/2004 | Wingrowicz |
| 2004/0203880 A1 | 10/2004 | Riley |
| 2004/0203885 A1 | 10/2004 | Quaid |
| 2004/0225681 A1 | 11/2004 | Chaney et al. |
| 2004/0248589 A1 | 12/2004 | Gwon et al. |
| 2005/0012613 A1 | 1/2005 | Eckstein et al. |
| 2005/0040968 A1 | 2/2005 | Damarla et al. |
| 2005/0044564 A1 | 2/2005 | Stopniewicz et al. |
| 2005/0066325 A1 | 3/2005 | Mori et al. |
| 2005/0102098 A1 | 5/2005 | Montealegre et al. |
| 2005/0113117 A1 | 5/2005 | Bolin et al. |
| 2005/0134696 A1 | 6/2005 | Nath et al. |
| 2005/0136938 A1 | 6/2005 | Kang |
| 2005/0169183 A1 | 8/2005 | Lakkakorpi |
| 2005/0192031 A1 | 9/2005 | Vare |
| 2005/0210342 A1 | 9/2005 | Schwagmann |
| 2005/0227683 A1 | 10/2005 | Draluk et al. |
| 2005/0239478 A1 | 10/2005 | Spirito |
| 2005/0282540 A1 | 12/2005 | Motamedi et al. |
| 2005/0282544 A1 | 12/2005 | Oommen et al. |
| 2005/0283540 A1 | 12/2005 | Fux et al. |
| 2006/0019665 A1 | 1/2006 | Aghvami et al. |
| 2006/0019679 A1 | 1/2006 | Rappaport et al. |
| 2006/0025068 A1 | 2/2006 | Regan et al. |
| 2006/0025158 A1 | 2/2006 | Leblanc et al. |
| 2006/0052057 A1 | 3/2006 | Persson et al. |
| 2006/0064346 A1 | 3/2006 | Steenstra et al. |
| 2006/0087425 A1 | 4/2006 | Haeberlen |
| 2006/0205417 A1 | 9/2006 | Ju et al. |
| 2006/0221901 A1 | 10/2006 | Yaqub et al. |
| 2006/0227045 A1 | 10/2006 | Sheynblat |
| 2006/0234701 A1 | 10/2006 | Wang et al. |
| 2006/0270421 A1 | 11/2006 | Phillips et al. |
| 2007/0001867 A1 | 1/2007 | Rowe et al. |
| 2007/0087764 A1 | 4/2007 | Buckley et al. |
| 2007/0121520 A1 | 5/2007 | Shrikhande et al. |
| 2007/0123268 A1 | 5/2007 | Parata |
| 2007/0208495 A1 | 9/2007 | Chapman et al. |
| 2007/0232319 A1 | 10/2007 | Bells et al. |
| 2007/0259670 A1 | 11/2007 | Sakhpara |
| 2007/0270168 A1 | 11/2007 | Sheynblat |
| 2007/0288166 A1 | 12/2007 | Ockerse et al. |
| 2007/0297346 A1 | 12/2007 | Huismann et al. |
| 2008/0004037 A1 | 1/2008 | Achlioptas et al. |
| 2008/0061967 A1 | 3/2008 | Corrado |
| 2009/0160939 A1 | 6/2009 | Fernandez et al. |
| 2009/0182630 A1 | 7/2009 | Otto et al. |
| 2009/0227266 A1* | 9/2009 | Baik et al. ................ 455/456.1 |
| 2010/0167725 A1 | 7/2010 | Noldus et al. |
| 2010/0231445 A1* | 9/2010 | Tarlow .................... 342/357.28 |
| 2011/0018769 A1* | 1/2011 | Misikangas et al. .......... 342/451 |
| 2011/0244919 A1 | 10/2011 | Aller et al. |
| 2012/0253668 A1 | 10/2012 | Sheha et al. |

FOREIGN PATENT DOCUMENTS

| | | |
|---|---|---|
| EP | 0431956 A2 | 7/1990 |
| EP | 0874248 A2 | 10/1998 |
| EP | 0936758 A2 | 8/1999 |
| EP | 0982964 A2 | 3/2000 |
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |

| | | |
|---|---|---|
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 02/47421 | 12/2001 |
| WO | WO 0195592 | 12/2001 |
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2007/115777 | 10/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

3GPP TR05.08, "Radio Subsystem Link Control", Nov. 2005.
3GPP SA WG2, "Voice Call Continuity between CS and IMS Study" 3GPP TR 23.806 V7 0.0, 1, Dec. 2005, pp. 1-153, XP002385067.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
Specification 3GPP TS 03.22, "Radio Access Network; Functions Related to Mobile Station(MS) in Idle Mode and Group Receive Mode", 1999.
International Search Report of PCT/AU2006/001577 dated Nov. 28, 2006.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search report dated Jul. 25, 2012 for European Patent Application 06790349.2.
M. Hata, "Empirical formula for propagation loss in land mobile radio services" IEEE Transactions on Vehicular Technology, vol. VT-29, pp. 317-325, Aug. 1980.
T. Roos, P. Myllymaki, and H. Tirri, "A statistical modeling approach to location estimation," IEEE Transactions on Mobile Computing vol. 1, pp. 59-69, Jan. 2002.
T. Halonen J. Romero and J. Melero, GSM, GPRS and EDGE Performance; Evolution Towards SG/UMTS. John Wiley and Sons, 2nd ed., 2003.
L.M. Correia, Wireless Flexible Personalized Communications: COST 259 European Co-Operation in Mobile Radio Research. Wiley 2001.
IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.
3rd Generation Partnership Program, "3GPP TR 25.942 Radio Frequency (RF) System Scenarios," tech. rep., 3GPP, 2004.
Schwartz et al., "On the Distribution and Moments of Power Sums with Logonormal Components", Bell Sys. Tech, J., vol. 61, No. 7, pp. 1441-1463.
Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.
W.C.Y. Lee, Mobile Communications Engineering. McGraw-Hill, 1982.
Bernardin et al., "Cell Radius Inaccuracy: A New Measure of Coverage Reliability", IEEE Transactions on Vehicular Technology, vol. 47, No. 4, Nov. 1998.
W.H. Press S. A. Teukolsky, W.T. Vetterling & B.P. Flannery, "Numerical Recipes in C++; The Art of Scientific Computing", 2nd Ed, Feb. 2002, Cambridge University Press.
C.R. Drane, Positioning Systems—A Unified Approach, Lecture Notes in Control and Infromation Sciences, Springer Verlag, Oct. 1992.
P.L.H.A.S. Fischer, "Evaluation of Positioning Measurement Systems," T1P1.5/97-110, Dec. 1997.
A.M. Zoubir and B. Boobash, "The Bootstrap and Its Application in Signal Processing," IEEE Signal Processing Magazine, 15(1):56-76, Jan. 1998.
Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.
Section 2.7 of Mobile Radio Communications 2nd Ed. Steele and Hanzo, IBSN 047197806X, J. Wiley & Sons Ltd., 1999.
B. Matsumori T1P1.5/98-600 "Radio Camera System and Location Fingerprinting Technology", Presentation Submission to Location Standards Working Group T1P1.5 by U.S. Wireless 1998.
Annex I of GSM 05.05 "Digital cellular Telecommunication System (Phase 2)", Radio Transmission and Reception, 2001.
S.R. Saunders & A. Aragon-Zavala, Antennas and Propagation for Wireless Communications Systems: 2nd Ed., Wiley 2007.
Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.
Specification 3GPP TS 31.111—Sections 6.4, 6.616, 6.6.21 and 6.6.22.
"Computational Geometry in C (Cambridge Tracts in Theoretical Computer Science)", Joseph O'Rourke, Cambridge University Press; 2000 edition, ISBN 0521649765.
European Search Report dated Nov. 4, 2010 for EP 08714391.3.
International Search Report dated Sep. 20, 2004 for PCT/AU2004/000983.

European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19, 2009 for EP 06705017.9.
OMA Download Architecture-Version 1.0, Jun. 25, 2004.

* cited by examiner

SYSTEM AND METHOD FOR MONITORING AND DISSEMINATING MOBILE DEVICE LOCATION INFORMATION

BACKGROUND

Mobile communication devices such as cellular telephones and smart phones including Global Positioning System ("GPS") receiver functionality often operate poorly in indoor environments with regard to generating precise and accurate location information. For proper operation, GPS receiving devices receive locating signals from GPS satellites, which signals may be blocked by buildings, structures, or other environmental features. Large structures such as malls, office buildings, schools, and parking garages are particularly troublesome, preventing precise and accurate location information from being generated by a mobile device within such structures.

Some mobile device systems are configured to use ground-located cellular base transceiver station signals for computing location, which signals are typically better than GPS signals at penetrating indoor environments. Suitable non-limiting methods for determining location based on base transceiver station signal measurement include but are not limited to: Angle of Arrival ("AOA"), in which the angles of arrival of signals from two base transceiver stations of known position are determined; Time Difference of Arrival ("TDOA") or Time of Arrival ("TOA"), in which lengths of time it takes to receive signals from three or more base stations of known position are determined; Enhanced Observed Time Difference ("EOTD"), in which lengths of time it takes to receive signals from three or more base stations of known position are determined based on timing data provided via the network; Advanced Forward Link Trilateration ("AFLT"), in which the device position is triangulated based on signal measurements from three or more base stations of known position by determining phase differences of the signals and signal strengths; and signal strength triangulation, in which the device position is triangulated based on signal strength measurements from three or more base stations of known position. Like GPS signals however, signals sent to or received from cellular base transceiver stations may also be impeded by building structures or other environmental features.

It is common for location-based applications and services that depend on GPS and related technologies to include disclaimers that the application or service may not function well when a mobile device from which location information is generated is located indoors. There are currently many location-based applications configured to reside on or enable communication with mobile devices, for example smart phones such as the iPhone™ brand smart phone. Such applications typically only function well if the quality of the location information they rely on is accurate and precise. For example, if execution of a turn-by-turn driving directions application is initiated on a mobile device while the mobile device is in a parking garage shielded from GPS locating signals, the application may not obtain a starting location and therefore cannot begin computing directions for a user.

A user, system, or application which generates a real-time request for a mobile device's location relying on GPS signals, base transceiver station signals, or related systems is likely to obtain poor location data or no useable location data if the mobile device's happens to be indoors at the time of the request. It would be desirable to provide a system for disseminating precise and accurate location information to users, systems, and applications. Such provided system should address inherent deficiencies of GPS or base transceiver station signal reception to provide location information even where reception of signals is impeded.

SUMMARY

The invention provides a computer-implemented mobile device locating method. The method includes monitoring a location indication of a mobile device and an indication of precision or accuracy of the location indication. A change in the precision or accuracy of the location indication is identified, and a position of the mobile device is estimated based on the location indication as monitored prior to the identified change.

The invention further provides a mobile device including a processor and a memory including instructions operable to enable the processor to perform a procedure. The procedure includes monitoring a location indication of a mobile device and an indication of precision or accuracy of the location indication. A change in the precision or accuracy of the location indication is identified, and a position of the mobile device is estimated based on the location indication as monitored prior to the identified change.

The invention further provides non-transitory computer-readable media tangibly embodying a program of instructions executable by a computing device to implement a method, the computing device being capable of interfacing with a communications network. The method includes monitoring a location indication of a mobile device and an indication of precision or accuracy of the location indication. A change in the precision or accuracy of the location indication is identified, and a position of the mobile device is estimated based on the location indication as monitored prior to the identified change.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

The preferred embodiments of the invention are described below with reference to the drawing figures where like numerals represent like elements throughout.

Figure 1:
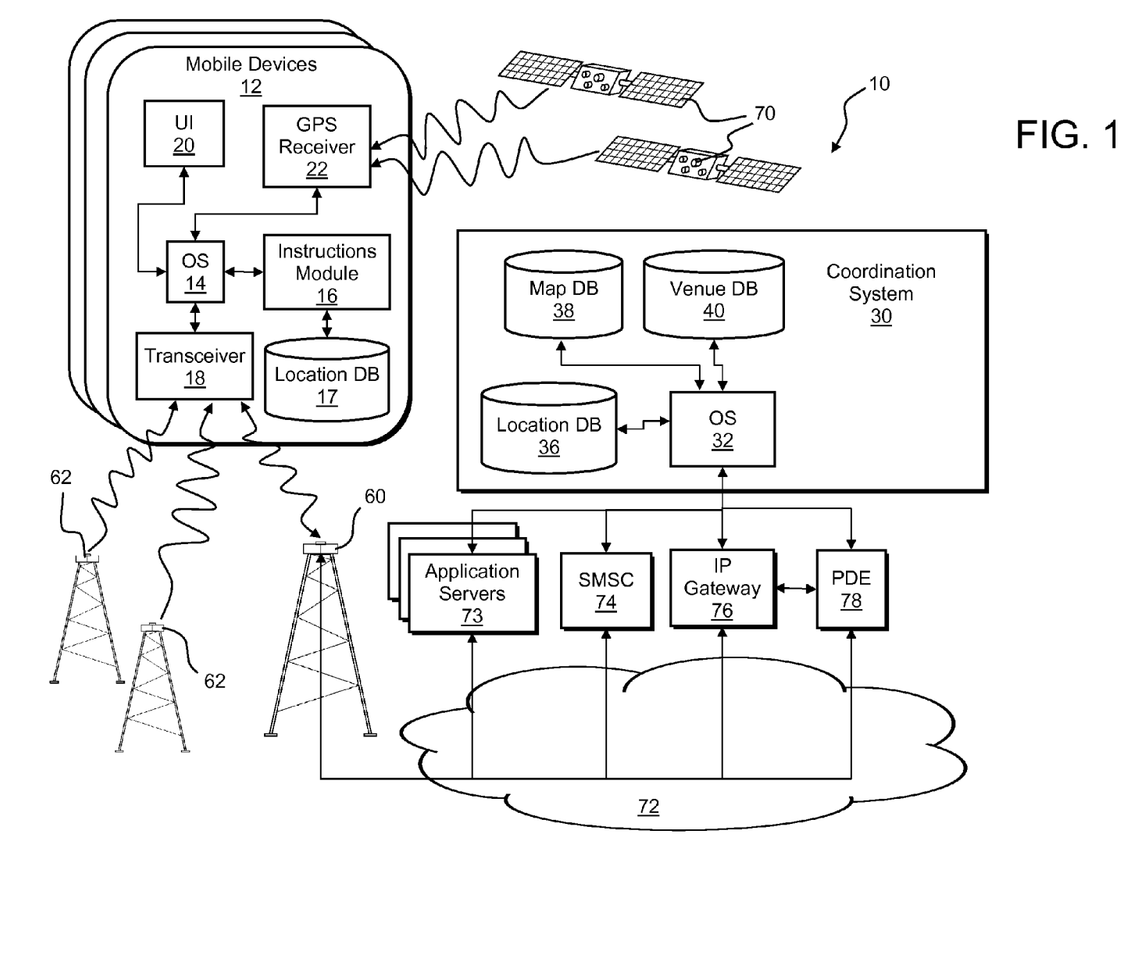
FIG. 1 is a schematic illustration of an exemplary operating environment in which mobile device communication systems are operable according to a preferred embodiment of the invention.

Referring to FIG. 1, a schematic illustration is shown of an exemplary operating environment 10 in which preferred mobile device communication systems in the form of mobile devices 12 and a coordination system 30 can be used. The mobile devices 12 and the coordination system 30 each include one or more computing devices and one or more memory devices, which computing devices and memory devices can be integrally constructed or connected in any suitable manner. It is to be understood that a system comprises a computer system, as is known in the art.

Each mobile device 12 preferably includes a processor or a plurality of processors which enable an operating system 14 and a module of instructions 16 preferably residing in a memory of the mobile device 12. The mobile device 12, which preferably includes cellular telephone functionality, further includes a transceiver 18 for communication with cellular base transceiver stations 60, 62 ("base stations") and a user interface 20, preferably including a display and one or more audio speakers. The transceiver 18 can be further configured to communicate with other wireless stations or devices, and the mobile device 12 can alternatively support a plurality of transceivers for communication with a plurality of wireless stations or devices of differing protocols. A GPS receiver 22 is preferably provided for receiving signals from GPS satellites 70.

The coordination system 30 includes a processor or processors which enable an operating system 32 and memory or memories which permit operation of databases 36, 38, 40. Preferably, collected mobile device location data is stored in a location database 36, map data corresponding to roads, addresses and other definable geographic data are stored in a map database 38, and computed dimensions for venues including buildings or other structures are stored in a venue dimensional attribute database 40. The coordination system 30 is preferably configured to collect data indicative of mobile device location of the mobile devices 12 via a telecommunication network 72 and to associate the mobile devices 12 with particular users. The location data is preferably received in the form of tuples. Each tuple preferably includes one or more location coordinates and one or more time stamps respectively associated with the one or more location coordinates. Each tuple also preferably includes an identification ("ID") relating the tuple to a particular mobile device and a precision indication indicating the precision and/or accuracy of the one or more location coordinates.

The tuples or other suitable mobile device location data are preferably received by the coordination system 30 in the form of one or more short message service ("SMS") messages received from the mobile devices 12 via a short message service center ("SMSC") 74, which may be integrated with the telecommunication network 72. Alternatively, location data can be sent by the mobile devices 12 using internet protocol ("TCP/IP") and received by the coordination system 30 via an internet protocol ("IP") gateway 76, which may be integrated with the telecommunication network 72. The coordination system 30 can alternatively query a remote position determining entity ("PDE") 78, a Gateway Mobile Location Center ("GMLC"), or other system for disseminating location data associated with mobile devices, which PDE 78, GMLC or other system may be provided as a service by a telecommunication carrier or other party, and which systems may deliver data to the coordination system 30 via internet protocol through the IP gateway 76 or via other suitable protocol. One or more external application servers 73 execute applications which use location data provided by the mobile devices 12 or the coordination system 30 to provide content or services to a user of a particular mobile device or other users requiring data regarding a particular mobile device.

Figure 2:
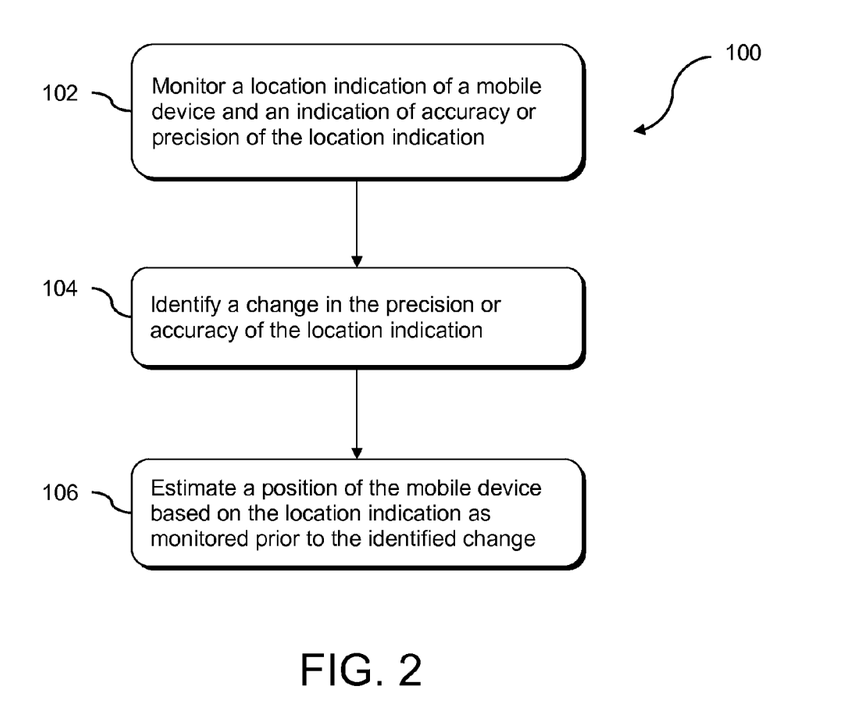
FIG. 2 is a flow chart showing a computer-implemented method for processing mobile device location data according to a preferred embodiment of the invention.

Referring to FIG. 2, a flow chart depicting a method 100 according to a preferred embodiment of the invention is shown. The locating method 100 comprises monitoring a location indication of a mobile device and monitoring an indication of at least one of precision and accuracy of the location indication (step 102). A change in the at least one of the precision and accuracy of the location indication is identified (step 104), and a position of the mobile device is estimated based on the location indication as monitored prior to the identified change (step 106). The method 100 further preferably includes identifying the absence of a location indication, wherein the position of the mobile device is estimated based on the location indication monitored prior to the identified absence.

The mobile device 12 is preferably configured for implementing methods according to the invention including the method 100, which mobile device 12 is preferably a location-aware GPS-enabled mobile telephone or other suitable transmitter/transceiver device capable of determining its location or enabling another system, such as the PDE 42 to determine its location. The mobile device 12 is preferably configured to perform methods according to the invention within the exemplary environment 10 or other suitable environment without assistance from the coordination system 30 via one or more applications executed by a processor of the mobile device 12. Alternatively, the coordination system 30 is configured for implementing the methods according to the invention within the exemplary environment 10 or other suitable environment. Methods of the invention are herein described with reference to the mobile device 12 and other systems shown in the operating environment 10 of FIG. 1. Alternatively, the methods of the invention can be performed by any suitable mobile device or one or more other systems with access to current location data of a mobile device.

Monitoring the location indication according to the method 100 preferably includes collecting over a period of time a plurality of location coordinates of the mobile device 12 corresponding to particular levels of precision or accuracy. Tuples associated with a particular mobile device corresponding to a particular user are preferably collected, wherein each tuple is a data instance including a location coordinate, a time stamp, a precision and/or accuracy indication, and, if necessary, an identifier for the mobile device. The change in the location indication is determined by identifying at least one of the plurality of coordinates corresponding to a level of precision or accuracy different than that of at least a prior in time one of the plurality of coordinates. Such identification is preferably performed by identifying at least one of the plurality of coordinates corresponding to a level of at least one of precision and accuracy less than a defined threshold value. A decrease in a level of precision or accuracy of location coordinates may occur when GPS signals or other signals required for location determination are blocked or subject to attenuation or multipath fading or effects. A change in the location indication can alternatively be determined by identifying an absence of location coordinates, for example in a case where no suitable GPS signals or other signals required for location determination are received by the mobile device 12 at a particular time instance.

The defined threshold value can be a fixed value. Alternatively, the defined threshold can be variable, wherein a current threshold value is preferably defined based on levels of precision or accuracy associated with prior-recorded location coordinates. Variable thresholds are preferably defined based on average, mean or typical precision or accuracy indications of tuples associated with one or more mobile devices 12 in a particular environment, wherein a level of precision or accuracy of a location coordinate which is a less than such average, mean, or typical level by a predetermined degree, value or amount, is thereby determined to be less than the threshold value. Prior-recorded tuples from one or more mobile devices 12 including indications of precision or accuracy of location coordinates can be stored in the location database 17 of a mobile device 12 or the location database 36 of the coordination system 30, which mobile device 12 or coordination system 30 can determine a threshold value based on such prior-recorded data.

In response to an identified decrease in a level of precision or accuracy of a location indication, the position of the mobile device 12 is preferably estimated by extrapolation based on one or more of the plurality of coordinates corresponding to a first time period prior to the identified decrease, wherein a second time period after the identified decrease corresponds to one or more of the plurality of coordinates comprising a level of precision or accuracy less than that of the one or more of the plurality of coordinates of the first time period. The one or more coordinates corresponding to the first time period prior to the identified change are preferably rendered accessible to a user, system or application, as monitored. During the second time period after the identified change, the estimated position is correlated with the second time period and rendered accessible to the user, system or application as correlated with the second time period. In response to a later identified increase in the level of precision or accuracy of the location indication, one or more of the plurality of coordinates corresponding to a third time period after the identified increase are preferably rendered accessible to a user, system or application, as monitored.

Preferably, when a monitored location indication corresponds to a level of precision or accuracy equal to or above a predetermined threshold value, the location coordinates associated with the monitored location indication are rendered accessible. When the monitored location indication corresponds to a level of precision or accuracy below a predetermined threshold or when location data is unavailable, an estimated position is rendered accessible, which estimated position is determined by extrapolation based on a previously monitored location indication corresponding to a level of precision or accuracy above the predetermined threshold. In such manner, in rendering location data accessible to a user, system, or application, estimated positions are substituted for potentially imprecise or inaccurate location coordinates.

The estimated position can be extrapolated based on a direction of travel of the mobile device 12 as determined from two or more of the plurality of coordinates corresponding to the time period prior to the identified decrease in location precision or accuracy, and preferably substantially immediately or near in time prior to the identified decrease. To assist in estimating a position of the mobile device 12, environmental data related to buildings or other structures where the mobile device 12 is likely to travel is collected to determine a likely position of the mobile device. Preferably, dimensional attributes of one or more venues are collected and the mobile device position is estimated to be within an area defined by the dimensional attributes a venue in response to a decrease in a level of precision or accuracy of the location indication. Preferably, a mobile device 12 which is determined based on its location coordinates to be heading along a particular path at a particular speed prior to a decrease of a level of precision or accuracy of its location indication below a threshold, is correlated with a venue at a location in the path or within reasonable proximity of the path and within reasonable proximity of the determined location of the mobile device 12 substantially immediately prior to the decrease in the level of precision or accuracy of the location indication. For example, a mobile device 12 which is determined to be near and moving toward a parking garage can be predicted to have entered the parking garage at the point where a decrease in the level the precision of one or more location coordinates generated via the mobile device 12 are identified.

Dimensional attributes of a venue include preferably estimates of a size, shape, and location of a building that may contain a user with a mobile device. Dimensional attributes can be collected in a variety of ways from multiple sources that are not mutually exclusive. Dimensional attributes can be sourced from public property records setting forth boundaries for a plot of land that a particular building is on. Alternatively, public or private photographic street imagery can be analyzed to determine rooftop and building dimensions. Alternatively, dimensional attributes can be sourced from existing network-based services which collect and render available to the public data on building geometries as part of their mapping platforms. For example, Google™ and Microsoft™ brand mapping services enable an overlay of building geometries on top of their web-based maps in certain urban areas.

Dimensional attributes of a venue can further be determined through an analysis of previously collected location data instances, which can be stored in the location database 17 of a particular mobile device or the location database of the coordination system 30. Building locations can be inferred from collecting multiple GPS fixes from one or more devices, taking advantage of the fact that GPS receivers work well when outdoors and work poorly indoors within a building. In a particular area with a high density of previously collected GPS fixes, a building's location is preferably defined as the negative space where no high precision or high accuracy location fixes have been observed. By such process, exact geometries of dead spaces where location precision is low or no location data is available are learned, which dead spaces correspond to the dimensional attributes of a venue such as a building. Thereby, according to a preferred method of the invention, location indications of one or more mobile devices and indications of precision or accuracy of the location indications are monitored. An area is identified in which the location indications correspond to a level of precision or accuracy less than a predetermined threshold value or where location indications are absent. If the location indication of a particular mobile device shows that the particular mobile device was in reasonable proximity to the identified area prior to a decrease in the level of precision or accuracy or absence of the location indication, the position of a particular mobile device is estimated as within the identified area.

Figure 3:
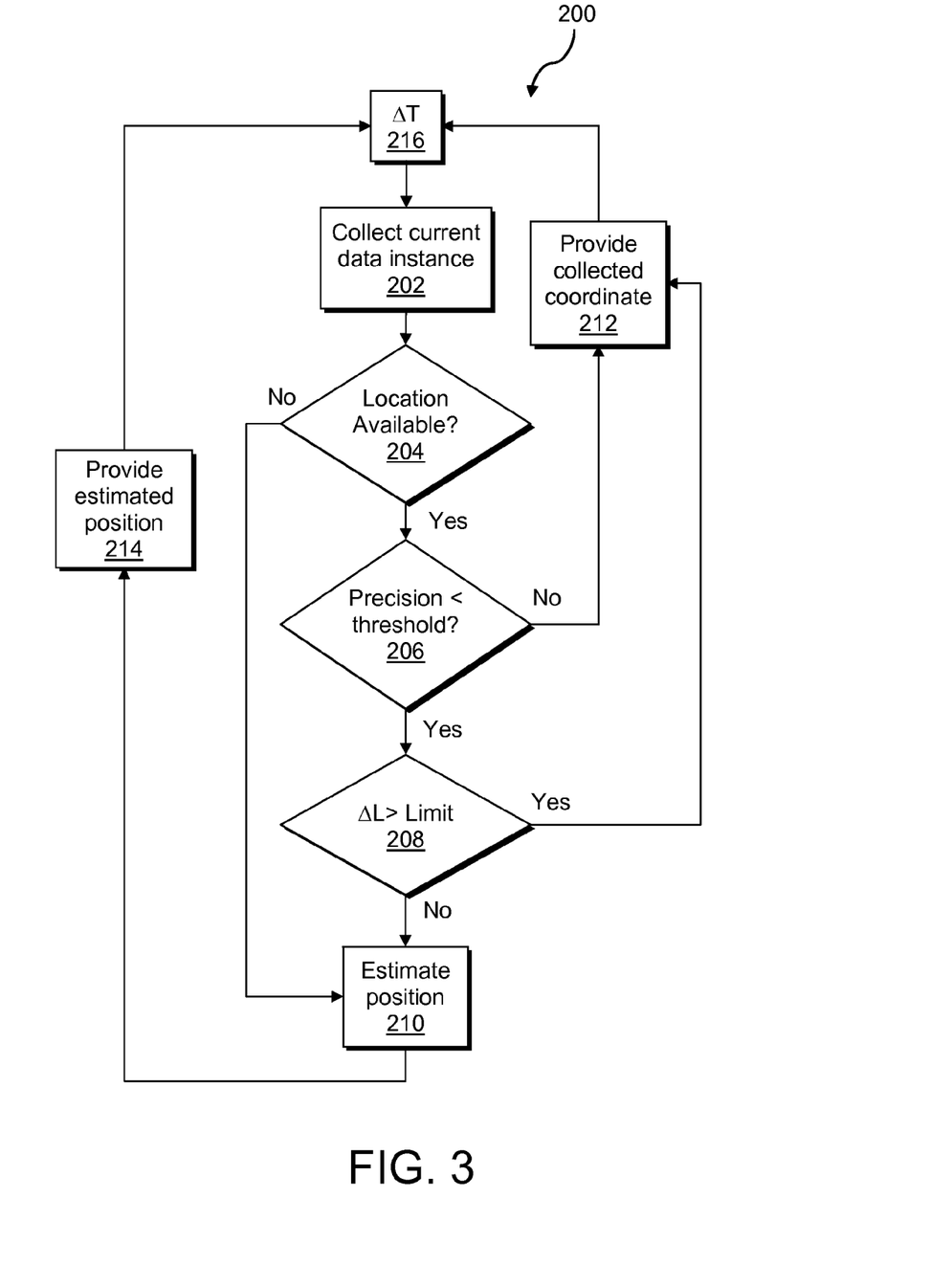
FIG. 3 is a process diagram showing a computer-implemented method for processing mobile device location data according to a preferred embodiment of the invention.

Referring to FIG. 3, a process diagram depicting a computer-implemented mobile device locating process 200 according to a preferred embodiment of the invention is shown. The process 200 is preferably implemented by one or more processors locally on a mobile device such as the mobile device 12 of FIG. 1, which can execute the process 200 via the module of instructions 16 enabled by the one or more processors. Alternatively, the locating process 200 can be performed using any suitable mobile device or a remote system such as the coordination system 30 in communication with a mobile device 12 via a network such as telecommunication network 72. The locating process 200 comprises collecting a current location data instance of a mobile device (step 202), which data instance preferably includes a location coordinate and an indication of precision or accuracy of the location coordinate. Collected data instances are stored in a history database such as the location database 17 of the mobile device 12 of FIG. 1, or alternatively the location database 36 of the coordination system 30. If it is determined that a location coordinate or other requisite information for locating the mobile device is unavailable in step 204, the process proceeds to estimate the mobile device position at step 210 described below. If the location coordinate is available, the indication of precision or accuracy is compared with a predetermined threshold value (step 206). If the indication of precision or accuracy corresponds to a value greater than or equal to the threshold value, the process proceeds to step 212, wherein the location coordinate corresponding to the collected current data instance is provided in substantially unmodified form to a user, an application or a system requiring the location coordinate. Additionally, if poor quality location information is collected a predetermined number of times corresponding to a coordinate with precision or accuracy less than the threshold value, instructions can be transmitted to a user of a mobile device 12 via its user interface 20 to move to a location where it is known that locating signals are not impeded and location coordinates corresponding to a level of precision and accuracy greater than or equal to the predetermined threshold can be rendered. A new current location data instance is collected after a step 216 corresponding to a predetermined cycling time period $\Delta T$. The cycling time period $\Delta T$ is preferably between 1 and 30 seconds, or alternatively, any period fixed or variable suitable for a particular application.

If the indication of precision or accuracy is determined in step 206 to correspond to a value less than the threshold value, the process proceeds to step 208 where it is determined whether the location coordinate of the current data instance corresponds to a location which is positioned from the location of one or more prior data instances by a distance ($\Delta L$) exceeding a predetermined limit distance. The one or more prior data instances can be designated as an immediately prior data instance or the most recent prior data instance corresponding to an indication of precision or accuracy of a value greater than or equal to the threshold value. If it is determined that the $\Delta L$ is greater than the predetermined limit distance the process proceeds to step 212, wherein the location coordinate corresponding to the collected current data instance is provided in substantially unmodified form to a user, an application or a system requiring the location coordinate. If it is determined the $\Delta L$ is less than or equal to the predetermined limit distance the process proceeds to step 210, where a position of the mobile device is estimated. Accordingly, even if relatively imprecise location data is collected, the collected location coordinate is provided substantially unmodified if the collected data indicates that the mobile device has moved a significant distance since a prior locate or is traveling at a significant rate of speed for a significant period of time, showing that despite imprecision of the location data it is unlikely that the mobile device is remaining within a particular indoor environment.

The estimated position determined in step 210 is preferably based on extrapolation from one or more location data instances collected prior to the current location data instance and corresponding indications of precision or accuracy greater than or equal to the threshold value. The estimated position can be further based in part on the current location data instance which corresponds to the indication of precision or accuracy less than the threshold value. In a step 214, the estimated position corresponding to the collected current data instance is provided to a user, an application or a system requiring the location coordinate. The estimated position can be provided in the form of one or more location coordinates or an indication of boundaries of a geographic area and can be defined by or correspond to the dimensional attributes of a known venue such as a building or a structure. Thereafter, a new current location data instance is collected at the step 216 corresponding to the predetermined cycling time period $\Delta T$.

The locating process 200 keeps track of a mobile device user's trail of locations. As a mobile device user enters a particular structure such as a parking garage, a series of relatively precise high quality locations leading up to a suddenly relatively imprecise low quality location or locations or a substantially complete absence of location information is witnessed. It is preferably determined through extrapolation that the user has entered the particular structure if the structure is within a predetermined distance from the last relatively high quality location. To make the determination that the user has entered the particular structure it is further preferred that the witnessed direction of travel leading up to the relatively low quality location or locations was in the general direction of the particular structure and that the low quality location or locations do not correspond to distances greater than a predetermined limit distance from the structure or from prior recorded locations. Thereafter, the structure's known position is provided as the mobile device's estimated position. So long as the determined current location remains at a low level of quality or is substantially unavailable, it is determined that the mobile device remains within the structure, and the implementing system, on the mobile device or a remote system, continues to render the estimated location accessible to a requesting user, a system or an application. Any requests to such implementing system for the user's location during this time will return the extrapolated location information rather than raw low quality GPS information or other location information generated by device-based GPS determination hardware or other device-based or remote position determination systems. Such implementing system preferably estimates the mobile device is still in the structure until it witnesses high quality location information leading away from the structure, or low quality location information that puts the mobile device in a location sufficiently distanced from the structure or from previously witnesses locations as to call into question whether the mobile device is still positioned at the structure.

A preferred approach to enabling the process 200 and other locating processes according to the invention involves running the process on one or more processors on a mobile device itself. The locating process can be configured to run selectively depending on factors including but not limited to the time of day and the user's proximity to locations of interest, or it can run substantially all the time. Preferably, the locating process is configured to run as a background process, but this is not a strict requirement. The process can be run as a standalone application, a helper application, as a process within another application, or even as part of the mobile device operating system itself. Alternatively, the process could run as an application in a carrier network or downstream there from, locating the device periodically by way of network application program interfaces ("APIs") rather than a process running on the mobile device itself. An application according to the invention is preferably configured to receive queries from requesting third party applications for the mobile device's location. Preferably, if real-time location, generated from GPS hardware or other device-based or remote position determining system is of high enough precision, the real-time generated location is transmitted to the requesting application. But if the location result is of low quality, providing reason to conclude the user is indoors, a higher quality estimate is returned to the requesting application based on the extrapolated location of a nearby building or structure.

The above-described processes according to the preferred invention embodiments address the limitations of current GPS and ground-located mobile device locating systems through recognizing: a) a mobile device is typically outside before it enters a signal impeding structure; b) the mobile device will be outside again after the mobile device leaves the signal impeding structure; and c) when the mobile device is outside, the mobile device is more likely to receive unimpeded signals for determining location. The above-described processes enable tracking of where a mobile device was last located before entering a signal impeding structure, and thereafter, instead of using the poor or unavailable location information reported while the mobile device is inside the impeding structure, the mobile device's location is reported as the position of the impeding structure or an extrapolated position within the impeding structure.

Figure 4:
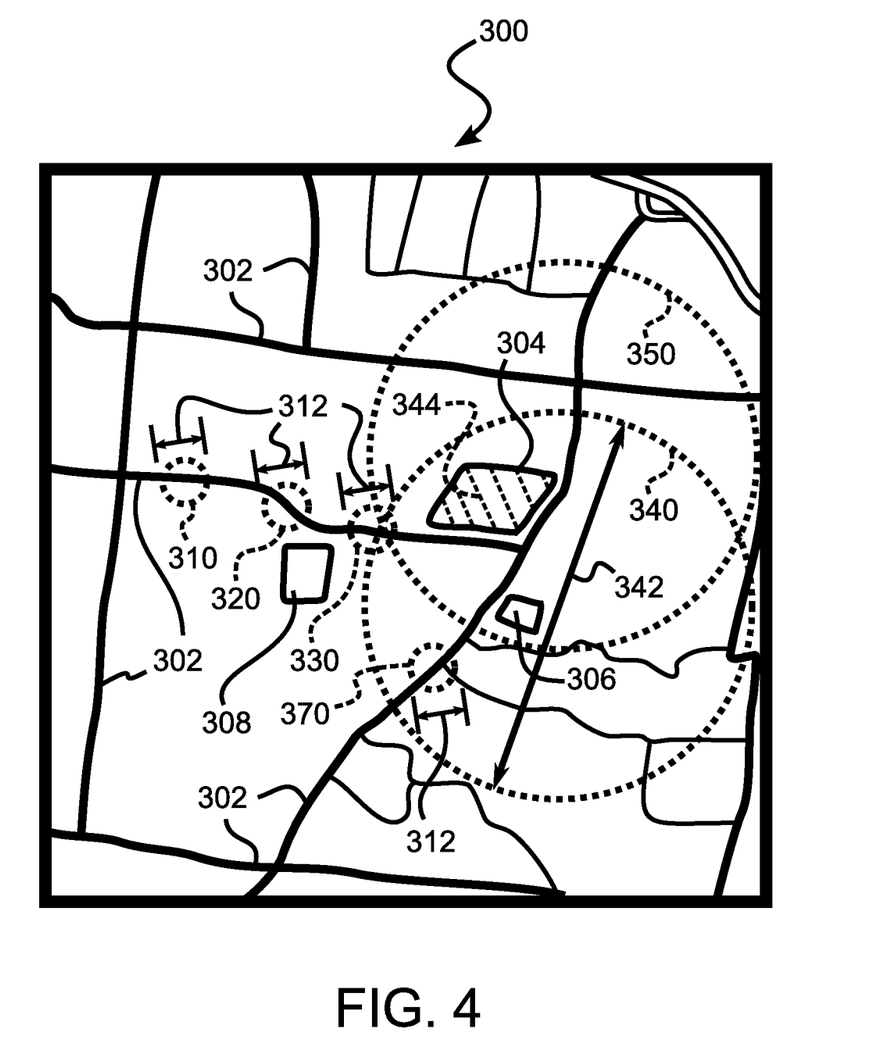
FIG. 4 is a plan view of an example roadmap for illustrating a method according to a preferred embodiment of the invention.

Referring to FIG. 4, an example map 300 illustrative of the performance of a method according to a preferred embodiment of the invention is shown. The map 300 includes roads 302 and building venues 304, 306, 308 including a mall 304, a restaurant 306, and a school 308. Dimensional attributes of the venues 304, 306, 308 are collected. Other known venues for which dimensional attributes can be collected preferably include building structures or other locations which may preclude transmission or receipt of locating signals by a mobile device, such as locating signals from GPS satellites or land base transceiver stations.

Location indication areas 310, 320, 330, 340, 350, 370 correspond to a monitored location indication of one particular mobile device at succeeding first, second, third, fourth, fifth and seventh time instances respectively. No location indication area corresponds with a sixth time instance between the fifth and seventh time instances, due to impeded device locating signals. The consecutive first, second, third, fourth, fifth, sixth and seventh time instances are separated by a known cycling time $\Delta T$. Each location indication area 310, 320, 330, 340, 350, 370 defines an area based on a precision indication and one or more location coordinates, within which area the particular mobile device is ostensibly located. While the location indication areas are shown as circular they can be any regular or irregular shape depending on the type and quality of the monitored location indication. As shown, the location indication areas 310, 320, 330, 340, 350, 370 are at different positions on the map 300 indicating motion of the mobile device during the succeeding time instances.

The first, second and third time instances respectively correspond to location indication areas 310, 320, 330 having equal diameters 312 corresponding to a first level of precision. Thereafter, at the succeeding fourth and fifth time instances, the location indication areas 340, 350 have a larger diameter 342 corresponding to a second level of precision less than the first level of precision of the previous location indication areas 310, 320, 330. Thereafter at the sixth time instance, no location indication is received, collected or observed. Thereafter, at the seventh time instance, the location indication area 370 corresponds to the diameter 312 indicating a return to the first level of precision. As shown, a level of precision of the location indication is inversely proportional to the diameter of the location indication area at a particular time instance.

A minimum precision level threshold value is defined which corresponds to a maximum location indication area. Location indication areas 310, 320, 330, 370 are less than the defined maximum location area, and therefore location coordinates corresponding to those areas are rendered accessible to a requesting or requiring user, application or system, which data can be rendered substantially real-time at each time instance as the location indication is monitored. The location indication area 340 corresponding to the fourth time instance is determined to be greater than the defined maximum location indication area, and accordingly, location indication area 340 corresponds to a level of precision less than the minimum precision level threshold value. In response to this determination, an estimate of the position of the mobile device at the fourth time instance is performed based on one or more of the location indication areas 310, 320, 330 and the dimensional attributes of one or more venues in proximity thereto.

The estimated position of the mobile device is determined as the footprint of the one of the building venues 304, 306, 308 which is nearest to and within a predetermined maximum distance from the location data instance immediately preceding the change in the level of precision, and which is in the direction of travel of the monitored mobile device. The predetermined maximum distance can optionally be set based on the average speed of the mobile device preceding the change in the level of precision, wherein a faster average speed corresponds to a larger predetermined maximum distance. In the illustrated example, the mobile device's average speed and direction on a road 302 prior to the fourth time instance corresponding to the decreased level of precision is determined based on the location coordinates of the first, second and third location indication areas 310, 320, 330 and the cycling time $\Delta T$ between the corresponding time instances. Based on the determined average speed, direction of travel, route of travel on the roads 302, and collected dimensional attributes of one or more venues within a predetermined distance from the location indication area 330, an extrapolated area 344 corresponding to a footprint area of the mall 304 is determined to be the extrapolated estimated position of the monitored mobile device. The school 308 is nearer than the mall 304 to the third location indication area 330, which immediately precedes the change in the level of precision. However, the direction of travel determined from the location indication areas 310, 320, 330 indicates that the mobile device is heading in the direction of the mall 304. The restaurant 306 is in the direction of travel of the mobile device, but the restaurant 306 is outside a maximum distance from the location indication area 330 based on the mobile device's determined average speed, and the mall 304 is closer to the third location indication area 330 than the restaurant 306. The predetermined distance is preferably based on the estimated velocity and direction of the mobile device prior to the decrease in precision of the location indication. The extrapolated area 344 corresponds to a predicted position of the mobile device during the fourth time instance at which the location indication area 340 is generated.

The location indication area 350 corresponding to the fifth time instance, following consecutively after the fourth time instance, is also greater than the defined maximum location indication area. The estimated position at the extrapolated area 344 corresponding to the mall 304 is maintained during the fifth time instance in response to the location indication area 350 exceeding the maximum location indication area and in response to the location indication area being within a predetermined distance from the mall 304. The estimated position 344 at the mall 304 is maintained during the sixth time instance in response to no location coordinate being observed or available at the sixth time instance. One or more location coordinates corresponding to the estimated position at the extrapolated area 344 are rendered accessible to a user, an application or a system, which data can be rendered substantially real-time at each of the fourth, fifth, and sixth time instances.

At the seventh time instance corresponding to the location indication area 370, which is not greater than the maximum location indication area, one or more location coordinates corresponding to the actual monitored location indication are rendered accessible to a user, application or system. As shown by the example map 300, a method according to a preferred embodiment of the invention enables quality location estimates to be delivered to a user, application or system even at times when location information currently available via a GPS receiver or other location determining system is inaccurate, imprecise or unavailable.

While the preferred embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computer-implemented mobile device locating method comprising:
    monitoring a location indication of a mobile device and an indication of at least one of precision and accuracy of the location indication;
    identifying a change in the at least one of the precision and the accuracy of the location indication;
    collecting venue dimensional attributes of a plurality of venues; and
    estimating a position of the mobile device based on the location indication as monitored prior to the identified change, wherein the mobile device position is estimated as within an area defined by the dimensional attributes of at least one of the plurality of venues in response to the at least one of the plurality of venues being positioned a predetermined distance from a coordinate corresponding to the location indication prior to the identified change.

2. The method of claim 1, further comprising rendering the estimated position accessible to at least one of a user of the mobile device, an application executed on the mobile device, and a system in communication with the mobile device via a network.

3. The method of claim 1, wherein identifying the change comprises identifying a decrease in a level of the at least one of the precision and the accuracy of the location indication.

4. The method of claim 1, further comprising:
    determining a direction of travel of the mobile device based on the location indication prior to the identified change; and
    estimating the mobile device position as within an area defined by the dimensional attributes of the at least one of the plurality of venues in response to the at least one of the plurality of venues being positioned substantially in the determined direction of travel.

5. The method of claim 1, further comprising:
    determining an average velocity of the mobile device based on the location indication prior to the identified change; and
    determining the predetermined distance from the coordinate corresponding to the location indication prior to the identified change based on the determined average velocity.

6. The method of claim 1, further comprising rendering accessible to at least one of a user, an application and a system the estimated position.

7. The method of claim 1, wherein monitoring the location indication of a mobile device comprises monitoring at least one of a GPS location indication and a location indication based on base transceiver station signals.

8. A computer-implemented mobile device locating method comprising:
    monitoring a location indication of a mobile device and an indication of at least one of precision and accuracy of the location indication;
    identifying a first change in the at least one of the precision and the accuracy of the location indication;
    estimating the position of the mobile device in response to the first change in the at least one of the precision and the accuracy of the location indication, wherein the position of the mobile device is estimated based on the location indication as monitored prior to the identified first change;
    identifying a second change in the at least one of the precision and the accuracy of the location indication;
    rendering accessible to at least one of a user, an application and a system at least a portion of the location indication which corresponds to a time period before the first change in the at least one of the precision and the accuracy and at least a portion of the location indication which corresponds to a time period after the second change in the at least one of the precision and the accuracy; and
    rendering accessible to the at least one of the user, the application, and the system the estimated position, wherein the estimated position corresponds to a time period after the first change in the at least one of the precision and the accuracy and before the second change in the at least one of the precision and the accuracy.

9. The method of claim 8, wherein identifying the first change comprises identifying a decrease in a level of the at least one of the precision and the accuracy of the location indication, and wherein identifying the second change comprises identifying an increase in the level of the at least one of the precision and the accuracy of the location indication.

10. A computer-implemented mobile device locating method comprising:
    monitoring a location indication of a mobile device by collecting over a period of time a plurality of location coordinates of the mobile device corresponding to levels of at least one of precision and accuracy;
    identifying a change in at least one of precision and accuracy of the location indication by identifying at least one of the plurality of coordinates corresponding to a level of at least one of precision and accuracy different than that of at least a prior in time one of the plurality of coordinates; and
    estimating a position of the mobile device based on the location indication as monitored prior to the identified change.

11. The method of claim 10, further comprising identifying at least one of the plurality of coordinates corresponding to a level of at least one of precision and accuracy less than a defined threshold value.

12. The method of claim 11, further comprising defining the threshold value based on the level of at least one of precision and accuracy of the at least the prior in time one of the plurality of coordinates.

13. The method of claim 10, further comprising:
    estimating the position of the mobile device based on at least a first one of the plurality of coordinates corresponding to a first time period prior to the identified change, wherein a second time period after the identified change corresponds to at least a second one of the plurality of coordinates comprising a level of at least one of precision and accuracy less than that of the at least the first one of the plurality of coordinates;
    correlating the estimated position with the second time period; and
    rendering accessible to at least one of a user, an application, and a system the at least the first one of the plurality of coordinates corresponding to the first time period and the estimated position correlated with the second time period.

14. The method of claim 13, further comprising estimating the position of the mobile device based on a direction of travel determined from at least two of the plurality of coordinates corresponding to the first time period prior to the identified change.

15. The method of claim 10, further comprising:
identifying a first change and a second change in the at least one of the precision and the accuracy of the plurality of coordinates;
estimating the position of the mobile device based on at least a first one of the plurality of coordinates corresponding to a first time period prior to the first identified change, wherein a second time period after the first identified change corresponds to at least a second one of the plurality of coordinates comprising a level of at least one of precision and accuracy less than that of the at least the first one of the plurality of coordinates, and wherein a third time period after the second identified change corresponds to at least a third one of the plurality of coordinates comprising a level of at least one of precision and accuracy greater than that of the at least the second one of the plurality of coordinates;
correlating the estimated mobile device position with the second time period; and
rendering accessible to at least one of a user, an application, and a system the at least the first one of the plurality of coordinates corresponding to the first time period, the estimated mobile device position correlated with the second time period, and the at least the third one of the plurality of coordinates corresponding to the third time period.

16. The method of claim 10, further comprising:
identifying an area in which at least one of:
the plurality of coordinates correspond to a level of at least one of precision and accuracy less than a predetermined threshold value; and
none of the plurality of coordinates are present; and
estimating the position of the mobile device as within the identified area.

17. The method of claim 10, further comprising:
identifying an absence of the location indication; and
estimating the position of the mobile device based on the location indication monitored prior to the identified absence.

18. A computer-implemented mobile device locating method comprising:
collecting over a period of time a plurality of location coordinates of a mobile device corresponding to levels of at least one of precision and accuracy;
identifying a time instance at which at least one of the plurality of coordinates corresponds to a level of at least one of precision and accuracy less than a defined threshold value or at which a location coordinate is unavailable;
collecting venue dimensional attributes of at least one venue;
estimating the mobile device position as within an area defined by the dimensional attributes of the at least one venue in response to at least one of the plurality of location coordinates corresponding to a time period prior to the identified time instance being positioned a predetermined distance from the at least one venue; and
rendering the estimated mobile device position accessible to at least one of a user of the mobile device, an application executed on the mobile device, and a system in communication with the mobile device via a network.

19. The method of claim 1, further comprising:
identifying an absence of the location indication; and
estimating the position of the mobile device based on the location indication monitored prior to the identified absence.

20. A computer-implemented mobile device locating method comprising:
monitoring a location indication of a mobile device by collecting a plurality of location coordinates corresponding to levels of at least one of precision and accuracy greater than or equal to a predetermined threshold value;
identifying a change in the at least one of the precision and the accuracy of the location indication to a value less than the predetermined threshold value;
estimating a position of the mobile device based on the location indication as monitored prior to the identified change; and
providing instructions to a user of the mobile device indicating a direction of travel to at least one of the plurality of coordinates corresponding to the level of at least one of precision and accuracy greater than or equal to the predetermined threshold value in response to identifying a change in the at least one of the precision and the accuracy of the location indication to a value less than the predetermined threshold value.

21. A computer-implemented mobile device locating method comprising:
monitoring location indications of a plurality of mobile devices and at least one of precision and accuracy of the location indications of the plurality of mobile devices;
identifying an area in which at least one of:
the location indications of the plurality of mobile devices correspond to a level of at least one of precision and accuracy less than a predetermined threshold value; and
location indications are absent;
identifying at least one of a decrease in a level of the at least one of the precision and the accuracy of the location indication and an absence of the location indication of a particular mobile device; and
estimating the position of the particular mobile device as within the identified area based on the location indication of the particular mobile device as monitored prior to at the least one of the identified decrease and identified absence.

22. A mobile device comprising at least one processor and at least one memory comprising instructions operable to enable the at least one processor to perform a procedure comprising:
monitoring a location indication of a mobile device by collecting over a period of time a plurality of location coordinates of the mobile device corresponding to levels of at least one of precision and accuracy;
identifying a change in at least one of precision and accuracy of the location indication by identifying at least one of the plurality of coordinates corresponding to a level of at least one of precision and accuracy different than that of at least a prior in time one of the plurality of coordinates; and
estimating a position of the mobile device based on the location indication as monitored prior to the identified change.

23. Non-transitory computer-readable media tangibly embodying a program of instructions executable by a computing device to implement a method, the computing device being capable of interfacing with a communications network, the method comprising:

monitoring a location indication of a mobile device by collecting over a period of time a plurality of location coordinates of the mobile device corresponding to levels of at least one of precision and accuracy;

identifying a change in at least one of precision and accuracy of the location indication by identifying at least one of the plurality of coordinates corresponding to a level of at least one of precision and accuracy different than that of at least a prior in time one of the plurality of coordinates; and estimating a position of the mobile device based on the location indication as monitored prior to the identified change.

* * * * *